Sept. 23, 1969   C. E. BALKUS   3,468,586
BRAKE HOLDING DEVICE
Filed May 10, 1968
FIG. 1
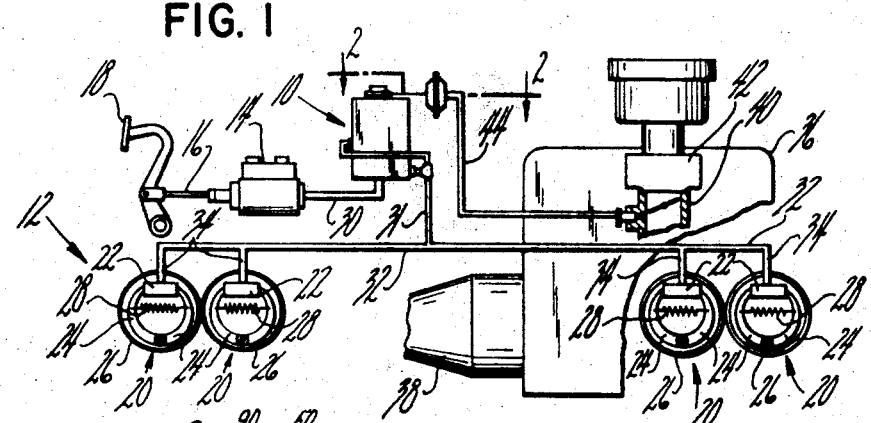
FIG. 2
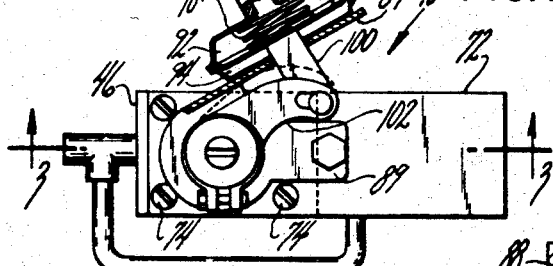
FIG. 4
FIG. 3
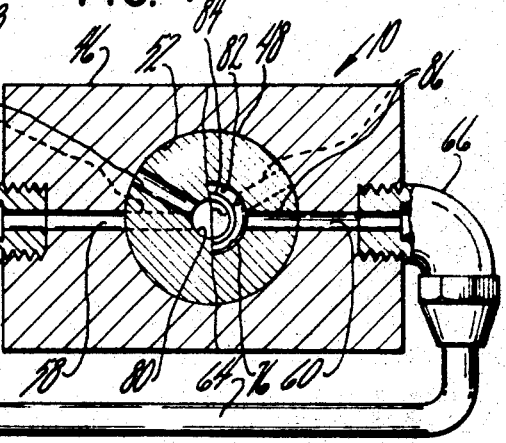
INVENTOR.
CARL E. BALKUS
BY
*McCormick, Paulding & Huber*
ATTORNEYS

United States Patent Office 3,468,586
Patented Sept. 23, 1969

3,468,586
BRAKE HOLDING DEVICE
Carl E. Balkus, Birch Mountain Road,
Glastonbury, Conn. 06033
Filed May 10, 1968, Ser. No. 728,282
Int. Cl. B60t 17/16, 11/10; B60r 25/08
U.S. Cl. 303—89                      6 Claims

ABSTRACT OF THE DISCLOSURE

A brake holding device for an hydraulic brake system on a motor vehicle or the like comprises a housing having passageways therethrough for connection in series with the system between a master cylinder and brake cylinders. A cylindrical control spindle coaxially received in a bore in the housing and angularly movable relative thereto has ports therein which cooperate with the passageways in the housing to alter the path of fluid flow therethrough. A check valve associated with one path of flow permits pressure fluid to flow from the master cylinder to the brake cylinders but prevents retrograde flow so that pressure fluid may be trapped in the system between the brake cylinders and the housing to maintain the brakes in applied or holding position. Means are provided to move the spindle from one position to another in response to the operation of the vehicle's engine.

BACKGROUND OF INVENTION

This invention relates in general to brake holding devices and deals more particularly with a holding device for a fluid actuated brake system on a motor vehicle or the like.

The general aim of the present invention is to provide an improved brake holding device of the aforedescribed type which in comparison to present structures of the same general type is of simpler construction and lower manufacturing costs, while nevertheless exhibiting qualities the same or better than present structures.

SUMMARY OF INVENTION

In accordance with the present invention a brake holding device is provided for connection in series with a conventional fluid actuated brake system on a motor vehicle or the like. The device has a housing which provides paths of fluid flow therethrough and a cylindrical control spindle received in a bore in the housing and angularly movable relative thereto to alter the path of flow through the housing. A check valve associated with one flow path permits flow in one direction through the housing but prevents retrograde flow therethrough so that pressure fluid may be trapped in a portion of the system to hold brakes in an applied position when the vehicle is parked. A means is also provided to move the spindle in response to the operation of an engine on an associated vehicle and thereby release braking pressure maintained by the device.

BRIEF DESCRIPTION OF THE DRAWINGS

FIG. 1 is a schematic view of a fluid brake system and other parts of a motor vehicle having a brake holding device embodying the present invention connected thereto.

FIG. 2 is a plan view of the device shown in FIG. 1, a portion of the device being shown in section taken generally along the line 2—2 of FIG. 1.

FIG. 3 is a sectional view through the device of FIG. 2 taken generally along the line 3—3 of FIG. 2.

FIG. 4 is a somewhat enlarged sectional view of a device of FIG. 1 taken generally along the line 4—4 of FIG. 3.

DETAILED DESCRIPTION OF PREFERRED EMBODIMENT

Turning now to the drawing and referring first particularly to FIG. 1 a brake holding device embodying the invention and indicated generally at 10 is shown connected to a fluid or hydraulic brake system indicated generally at 12 and other parts of a motor vehicle. The brake system 12 is shown schematically and includes a master cylinder 14 which has a piston (not shown) actuated by piston rod 16 operably connected to a pivotally mounted brake pedal 18 to which pressure is applied to produce fluid pressure in the system. Individual brake units associated with each wheel on the vehicle and indicated generally at 20, 20 are actuated by the pressure fluid in the system. Each unit 20 includes a fluid motor or brake cylinder 22 for urging brake shoes 24, 24 into frictional engagement with a brake drum 26 against opposing biasing force of a tension spring 28. The brake units 20, 20 are connected to the master cylinder 14 by main brake lines or fluid conduits 30 and 31 and branch conduits 32, 32 and 34, 34. The motor vehicle also includes a conventional internal combustion engine 36 for driving the vehicle through a transmission 38. An intake manifold 40 on the engine receives fuel from a carburetor 42 controlled by a throttle mechanism (not shown). A vacuum is produced in the manifold when the engine is operating as is well known in the art. Further connection between the device 10 and the intake manifold 40 is provided by a conduit or vacuum line 44 in a manner to be hereinafter further discussed.

The brake holding device 10 is connected in series with the conduits 30 and 31 between the master cylinder 14 and the brake cylinders 22, 22 and provides means whereby fluid may be trapped in the brake cylinders to maintain the brake shoes 24, 24 in frictional engagement with the brake drums 26, 26 after braking pressure has been removed from the pedal 16. The device 10 generally comprises a housing 46 adapted for connection in series with the conduits 30 and 31 to provide a continuous path of fluid flow. The path of fluid flow through the housing 46 is altered by a control spindle 48, a portion of which is received in the housing and is movable relative thereto. In the illustrated embodiment a vacuum motor 50 is provided for moving the control spindle 48 in response to the operation of the engine 36 so that brake holding pressure maintained by the device is released when the engine is operated.

In the further description that follows the terms "inlet" and "outlet" are used with reference to various passageways and ports in the device. However, it should be understood that this has been done to facilitate description of the apparatus as the construction admits to the flow of fluid in either direction through at least some of these ports and passageways.

Considering the device 10 in further detail and referring now particularly to FIGS. 2–4, the housing 46 has a generally cylindrical outwardly opening bore 52. An inlet passageway 54 coaxially communicates with the inner end of the bore 52 and is threaded at its outer end to receive a conventional tube fitting 56 for connection to the conduit 30 to receive pressure fluid from the master cylinder 14. The housing 46 also has at least one outlet passageway which communicates with the bore 52 for connection with the conduit 31 to provide a path of fluid flow from the device 10 to the brake cylinders 22, 22. Preferably and as shown two such outlet passageways are provided indicated respectively at 58 and 60. A T-shaped tube fitting 62 threaded into the outer end of the passageway 58 has two outlets, one of which is connected to the conduit 31 to supply pressure fluid to the brake cylinders 22, 22. The other outlet on the fitting 62 is connected to the passageway 60 by a conduit 64 and a tube fitting 66 which is threaded into the outer end of the latter passageway.

The generally cylindrical control spindle 48 is received in the bore 52 for angular movement relative to the housing 46 and has an annular flange 68 spaced from its outer end and received in a counterbore at the outer end of the bore 52. To prevent fluid leakage from the device 10 and O-ring seal 70 received in another counterbore in the housing 46 surrounds the control spindle 48 adjacent the flange 68. The spindle is retained in assembly with the housing by a mounting bracket 72 secured to the housing by threaded fasteners 74, 74 and apertured to receive the outer or extending end portion of the spindle 48 therethrough.

The spindle 48 has a generally cylindrical outwardly opening bore 76 threaded at its outer end to receive a plug 78. At its inner end the spindle has an inlet port 80 which extends coaxially therethrough and communicates with the passageway 54 and the bore 76. The port 80 is generally cylindrical and of somewhat smaller diameter than the bore 76 so that a shoulder is formed at the inner end of the latter bore which provides a seating surface for a check valve 82 disposed in the spindle bore. A spring 84 received in the bore 76 bears against the plug 78 and urges the check valve 82 into sealing engagement with its associated seating surface. The check valve 82 is arranged to open in response to fluid pressure to permit fluid to flow into the spindle bore 76 through the passageway 54 and the inlet port 80 but to prevent flow in the opposite direction or from the spindle bore 76.

The spindle 48 is arranged for limited angular movement relative to the housing 46 and includes a generally radially extending outlet port 86 which communicates with the spindle bore 76 on the downstream side of the check valve 82 and with the outlet passageway 60 when the spindle is in its first or full line position as indicated in FIG. 4. A second generally radially extending spindle outlet port 88 communicates with the inlet port 80 and with the outlet passageway 58 when the spindle is rotated in a counterclockwise direction to its second or broken line position as indicated in FIG. 4.

The vacuum motor 50 which moves the spindle 48 from its first to its second position in response to the operation of the engine 36 is of a generally conventional type. It is secured to the mounting bracket 72 by an angle bracket 89 and includes a casing 90 divided into two closed chambers 92 and 94 by a movable diaphragm 96. A vent 97 is provided for the chamber 94 to allow air to enter and escape therefrom so that atmospheric pressure is maintained therein. A compression spring 98 positioned in the chamber 92 between the casing 90 and diaphragm 96 tends bias the diaphragm 96 toward the chamber 94. Connection between the spindle 48 and the vacuum motor 50 is provided for an actuating member 100 connected at one end to the center of the movable diaphragm 96 and at its other end to a link 102 which is in turn fastened to the extending end portion of the spindle 48. The chamber 92 is connected to the manifold 40 by the vacuum line 44.

Considering now the operation of the device, it will be evident that when the engine 36 is not operating the diaphragm 96 is biased toward the chamber 94 by the spring 98 so that the actuating member 100 at its associated link 102 cooperate to retain the control spindle 48 in its first or full line position as indicated in FIGS. 2–4. Under these conditions when braking pressure is applied to the pedal 16 pressure fluid flows from the master cylinder 14 through the conduit 30 and into the device 10 through the inlet passageway 54. Since the outlet port 88 is out of alignment with the outlet passageway 58 when the spindle 48 is in this position pressure fluid is constrained to flow into the spindle through the inlet port 80 and past the check valve 82 into the bore 76. When the spindle is in its first position the outlet port 86 is aligned with the outlet passageway 60 so that pressure fluid flows from the spindle bore 76 outwardly through the latter port and passageway and through the conduit 64 and fitting 62 to the conduit 31 and thence to the brake cylinders 22, 22. Since the check valve 82 serves to prevent retrograde flow along the aforedescribed flow path, pressure fluid will be trapped in the system between the device 10 and the brake cylinders 22, 22 after the applied braking pressure has been released from the pedal 16 so that brake shoes 24, 24 will remain in holding position.

When the engine is in operation, a vacuum is produced in the intake manifold 40, the vacuum line 44, and the chamber 92 so that the pressure of the atmosphere acting upon the diaphragm 96 in the chamber 94 will cause the diaphragm and its associated actuating member 100 to move toward the chamber 92 thereby moving the link 102 to rotate the spindle 48 in a counterclockwise direction to its second or broken line position as it is shown in FIG. 2. In the latter position the outlet port 86 is out of alignment with the passageway 60 and the outlet port 88 is in alignment with the outlet passageway 58 thereby establishing a flow path through the housing 46 which by-passes the check valve 82. The latter flow path includes the inlet passageway 54, the inlet port 80, the outlet port 88 and the outlet passageway 58. It will be evident that pressure fluid may flow in either direction along the latter flow path so that any fluid trapped in the system between the housing 46 and the brake units 20, 20 will be released when the spindle is moved to its second position. While the spindle is retained in its second position the brake units 20, 20 respond to the application of braking pressure on the pedal 16 in the conventional manner.

The drawing shows a preferred embodiment of the invention and such embodiment has been described, but it will be understood that various changes may be made from the construction disclosed.

I claim:

1. A brake holding device for a fluid brake system on a vehicle or the like including fluid pressure producing means, fluid actuated brakes and a conduit providing fluid connection therebetween, said device comprising a housing for connection in said conduit in series with said pressure producing means and said brakes and having a generally cylindrical bore, a generally cylindrical spindle coaxially received in said bore and angularly movable therein between first and second positions, said spindle in said first position providing one path of fluid flow between said pressure producing means and said brakes and in said second position providing another path of fluid flow therebetween, a check valve disposed in said spindle in said other path of fluid flow to permit fluid to flow from said pressure producing means to said brakes and to prevent retrograde flow, and means for moving said control spindle between said first and second positions.

2. A brake holding device for a fluid brake system as set forth in claim 1 wherein said vehicle includes an engine and said means for moving said control spindle is responsive to the operation of said engine.

3. A brake holding device for a fluid brake system as set forth in claim 2 wherein said engine includes vacuum producing means and said means for moving said spindle is a vacuum motor operably connected to said vacuum producing means.

4. A brake holding device for a fluid brake system as set forth in claim 1 wherein said spindle includes a portion extending from said housing and said means for moving said spindle includes a lever operably connected to said extending position.

5. A brake holding device for a fluid brake system as set forth in claim 1 wherein said spindle includes a bore partially defining said one and said other path and having said check valve disposed therein, said housing including an inlet passageway for connection to said conduit to receive fluid from said pressure producing means and communicating with said spindle bore downstream of said check valve, said inlet spindle bore communicating with said inlet passageway in both said first and second positions.

6. A brake holding device for a fluid brake system as set forth in claim 5 wherein said housing has at least one outlet passageway communicating with said housing bore for connection to said conduit to provide a path of fluid flow from said control unit to said brakes, said spindle having a first outlet port communicating with said spindle bore downstream of said check valve and with said outlet passageway in said first position and a second outlet port communicating with said spindle bore upstream of said check valve and with said outlet passageway in said second position.

References Cited

UNITED STATES PATENTS

| 1,965,459 | 7/1934 | Fischer | 188—152 X |
| 2,272,320 | 2/1942 | Freeman. | |
| 2,945,571 | 7/1960 | Yanda. | |
| 3,101,823 | 8/1963 | Flanagan | 192—3 |
| 3,363,947 | 1/1968 | Cagle. | |

FOREIGN PATENTS 834,198   3/1952   Germany.

MILTON BUCHLER, Primary Examiner

J. J. McLAUGHLIN, Jr., Assistant Examiner

U.S. Cl. X.R.

137—598; 188—152; 192—3; 303—18, 75